United States Patent [19]

Yamamuro

[11] Patent Number: 4,938,737
[45] Date of Patent: Jul. 3, 1990

[54] TRANSMISSION BELT

[75] Inventor: Sigeaki Yamamuro, Zushi, Japan

[73] Assignee: Nissan Motor Co., Ltd., Yokohama, Japan

[21] Appl. No.: 289,721

[22] Filed: Dec. 27, 1988

[30] Foreign Application Priority Data

Dec. 25, 1987 [JP] Japan ................... 62-326825

[51] Int. Cl.⁵ .............................................. F16G 1/24
[52] U.S. Cl. ..................................... 474/242; 474/245
[58] Field of Search ............... 474/201, 237, 242, 244, 474/245

[56] References Cited

U.S. PATENT DOCUMENTS

| 4,645,479 | 2/1987 | Bateman et al. | 474/242 |
| 4,766,829 | 8/1988 | Schlichthorst | 114/61 |
| 4,767,388 | 8/1988 | Tatara et al. | 474/245 |

FOREIGN PATENT DOCUMENTS

| 56-156539 | 12/1981 | Japan . |
| 59-226729 | 12/1984 | Japan . |
| 61-211554 | 9/1986 | Japan . |
| 62-126642 | 8/1987 | Japan . |
| 62-126643 | 8/1987 | Japan . |
| 62-133041 | 8/1987 | Japan . |
| 62-133042 | 8/1987 | Japan . |
| 62-180136 | 8/1987 | Japan . |
| 62-180138 | 8/1987 | Japan . |
| 62-180140 | 8/1987 | Japan . |
| 62-180143 | 8/1987 | Japan . |
| 62-174143 | 11/1987 | Japan . |
| 62-174145 | 11/1987 | Japan . |
| 62-174146 | 11/1987 | Japan . |
| 63-8456 | 1/1988 | Japan . |
| 63-8457 | 1/1988 | Japan . |
| 63-30630 | 2/1988 | Japan . |
| 63-56344 | 4/1988 | Japan . |
| 63-10644 | 5/1988 | Japan . |
| 62-180139 | 8/1988 | Japan . |

OTHER PUBLICATIONS

ECVT, Automotive Engineering, Jun., 1988, pp. 4-25.
Fiat uno CVT, Car Graphic, Feb., 1984, pp. 108-110.

Primary Examiner—Thuy M. Bui
Attorney, Agent, or Firm—Foley & Lardner, Schwartz, Jeffery, Schwaab, Mack, Blumenthal & Evans

[57] ABSTRACT

A transmission belt comprises a plurality of chains and a plurality of load blocks. For lateral insertion of the plurality of chains, each of the load blocks including chain receiving portions which open laterally to allow the lateral insertion. Link plates of each chain include concaves for receiving chain receiving portion defining edges to provide drive connection between the chain and the load blocks via the chain receiving portions.

8 Claims, 11 Drawing Sheets

V-SHAPED PULLEY GROOVE WALL · · · V-SHAPED PULLEY GROOVE WALL

TRANSMISSION BELT

RELATED APPLICATION

Reference is made to a related U.S. patent application Ser. No. 044,308, now U.S. Pat. No. 4,766,829 issued on Oct. 11, 1988.

BACKGROUND OF THE INVENTION

The present invention relates to a transmission belt.

A conventional transmission belt is disclosed in JP No. 56-156539. It comprises a first column of link plates, a second column of link plates, a plurality of load blocks arranged one behind another, and a plurality of joint pins, each interposed between the adjacent two load blocks. The link plates in the first column are linked by the joint pins to form a first chain, while the link plates in the second column are linked by the same joint pins to form a second chain. The load blocks have first and second chain receiving cutouts which the first and second chains are positioned in. In assembly, with a load block interposed between them, two joint pins have one end inserted into two pin holes formed through a link plate positioned in one chain receiving cutout of the load block and opposite ends inserted into two pin holes formed through another link plate positioned in the opposite chain receiving cutout of the load block, thereby forming a basic unit. Subsequently, a plurality of such basic units are assembled one behind another with a load block interposed therebetween. This load block interposed between the adjacent two basic units is locked in position between the adjacent two basic units by interconnecting the joint pins of the adjacent two basic units by two link plates positioned in one and opposite chain receiving cutouts of the load block.

This conventional transmission belt poses a problem that it requires tedious manual work in assembly which is quite difficult to convert into automation, and thus making mass production is impossible.

Another problem of this conventional transmission belt is that each of the load blocks has a pillar portion positioned between the one and opposite chain receiving cutouts which is subject to excessive stress during transmission of power by the belt since the transmission of power between the adjacent load blocks is performed by a joint pin interposed therebetween. Thus, the load blocks used in this conventional transmission belt cannot enjoy sufficiently long service life since it is difficult to strengthen the pillar portion that has a limited width between the one and opposite chain receiving cutouts.

An object of the present invention is to provide a transmission belt which is easy to assemble, which can be manufactured by automation, and which has a sufficiently long service life.

SUMMARY OF THE INVENTION

According to a transmission belt of the present invention, a plurality of chains are manufactured separately, and power is directly transmitted via engagement between link plates of the first and second chains and load blocks. More specifically, the load blocks and the chains are assembled by inserting the first and second chains into one and opposite chain receiving portions formed through each of the load blocks with concave means of the link plates receiving chain receiving portion defining edge means.

More specifically, there is provided a transmission belt for use a power transmission between two pulleys, each having pulley groove defining walls, including: a plurality of chains, each including a plurality of link plates and means for joining the link plates of each chain to permit articulation, a plurality of load blocks, each having tapered surfaces adapted to contact with the pulley groove defining walls, each of said plurality of load blocks including two chain receiving portions opening laterally to allow lateral insertion of said plurality of chains thereinto, respectively, each of said plurality of load blocks including edge means defining said two chain receiving portions, respectively. The plurality of link plates of each chain including concave means for receiving edge means upon the lateral insertion of the plurality of chains into said chain receiving portions.

DETAILED DESCRIPTION OF THE INVENTION

First Embodiment

Figure 1:
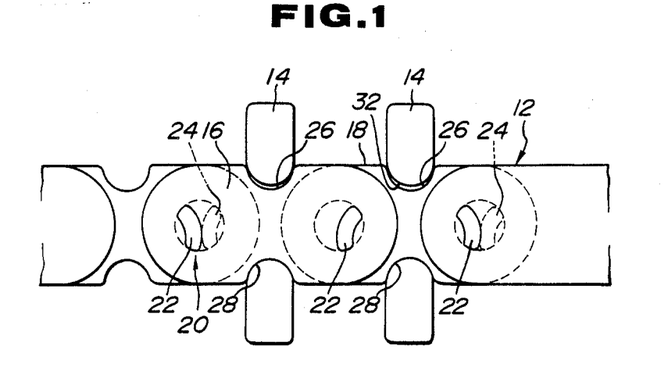
FIG. 1 is a fragmentary side elevation of a first embodiment of a transmission belt according to the present invention.
Figure 2:
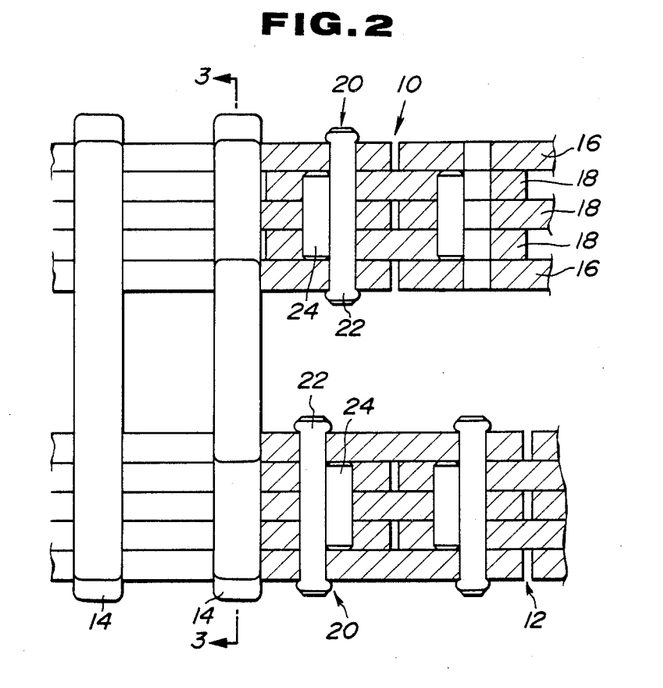
FIG. 2 is a fragmentary plan view of the first embodiment partly sectioned to show arrangement of joint pins.
Figure 3:
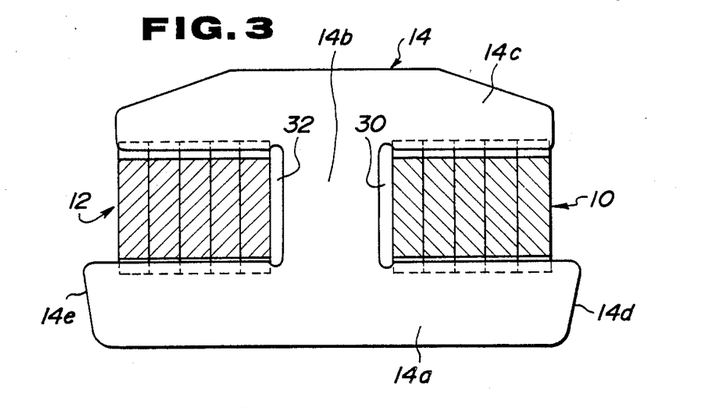
FIG. 3 is a section taken through the line 3—3 shown in FIG. 2.

FIGS. 1 to 3 show a first embodiment of a transmission belt according to the present invention. This transmission belt comprises a first chain 10, a second chain 12, and a great number of load blocks 14. The first and second chains 10 and 12 are basically the same and include two outer columns of link plates 16 which follow one behind the other, and three inner columns of link plates 18 which follow one behind the other, as best seen in FIG. 2. Each of the link plates in each column is displaced in a pitch direction by one half pitch with respect to the adjacent two link plates of the adjacent column and connected to them by two joint pin assemblies 20. Each of the joint pin assemblies 20 includes a joint pin 22 and a rocker pin 24. Each of the outer column link plates 16 is different from each of the inner column link plates 18 in that the outer column link plate 16 is formed with two holes each receiving one of the joint pins 22, whereas the inner column link plate 18 is formed with two holes each receiving not only one of the joint pins 22, but also one of the rocker pins 24. As best seen in FIG. 1, each of the outer column link plates 16 is formed from a rectangular plate with its longitudinal ends rounded and has rounded concave portions 26 and 28 in the form of cutouts extending inwardly from two parallel side margin lines connecting the rounded ends. Similarly, each of the inner column link plates 18 is formed with similar cutouts 26 and 28.

In assembly, the outer link plates 16 and inner link plates 18 are linked by the joint pins 22 and rocker pins 24, and then both protruded ends of the joint pins 22 are flattened to prevent disengagement of the joint pins 22.

As best seen in FIG. 3, each of the blocks 14 includes a main body portion 14a, a pillar portion 14b, and a guide portion 14c. Defined between the main body portion 14a and the guide portion 14c are chain receiving portions 30 and 32 in the form of two lateral cutouts. Each of the chain receiving portions 30 and 32 is defined by an edge and two parallel side edges interconnected by the end edge. The two parallel edges are contoured to snugly fit in the concave portions 26 and 28. The main body portion 14a has two tapered surfaces 14d and 14e adapted to engage V-shaped pulley groove defining walls of each of the pulleys.

The assembly of the transmission belt is explained.

Firstly, the first chain 10 and the second chain 12 are assembled separately. In this instance, as described above, the joint pins 22 are flattened at their ends so that the outer column and inner column link plates 16 and 18 are not separated from each other.

Secondly, the blocks 14 are arranged one behind another equidistant by a length corresponding to one half of the pitch.

Thirdly, the first and second chains 10 and 12 are inserted laterally into the chain receiving portions 30 and 32, respectively, with concave portion 26 and 28 receiving the chain receiving portion defining side edges. Thus, the load blocks 14 are now in driving connection with the outer column links plates 16 and the inner column link plates 18 via their engagements with the concave portions 26 and 28. Even though there is no positive means for preventing disengagement of the chains 10 and 12 out of the chain receiving portions 30 and 32, there is no fear of such disengagement if the finally assembled product of the transmission belt is tensioned between two pulleys. During power transmission by this transmission belt, a force transmitted through frictional engagement of the pulley groove defining walls and the tapered surfaces 14e and 14d of each of the load blocks is delivered to the first and second chains via engagement with the concave portions 26 and 28 of the link plates. Therefore, the main body portion 14a of each of the load blocks 14 is subject to stress due to the power transmission, and there is less stress applied to the pillar portion 14b of each load block 14. Since the pillar portion 14b which separates the chain receiving portions 30 and 32 from each other is subject to less stress, the load blocks 14 will enjoy a prolonged service life. A provision of the concave portions in the form of the cutouts 26 and 28 causes a reduction in strength of each link plate, but since the cutouts 26 and 28 are located at central portions spaced distant from both pin receiving holes, the reduction in strength is very small. Thus, assembly work of the first and second chains 10 and 12 is easily made by flattening the ends of the joint pins 22, and thus it is considerably facilitated. Besides, since the load blocks 14, the first chains 10, and the second chains 12 are quality controlled separately, the reliability of the manufactured products is enhanced.

Second Embodiment

Figure 4:
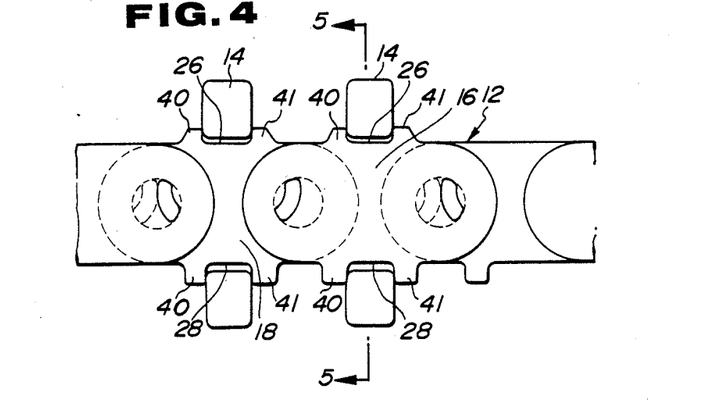
FIG. 4 is a similar view to FIG. 1, but showing a second embodiment of a transmission belt according to the present invention.
Figure 5:
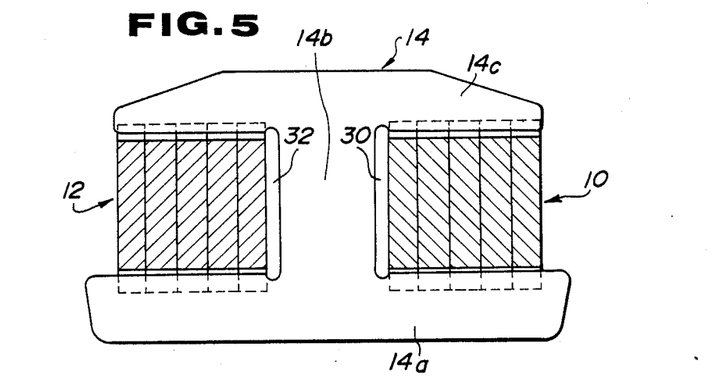
FIG. 5 is a section taken through the line 5—5 shown in FIG. 4.

FIGS. 4 and 5 show the second embodiment according to the present invention. This second embodiment is different from the preceding first embodiment in that each of outer column link plates 16 and inner column link plates 18 has a pair of projections 40 and 41 extending outwardly from each of the side margin edges thereof. The projections 40 and 41 of each pair define therebetween a concave portion 26 or 28. Since, in this second embodiment, the link plates 16 and 18 are not formed with cutouts to define concave portions, the link plates according to the second embodiment are advantageous over those according to the first embodiment in respect of their strength. However, since the load blocks with larger chain receiving portions are required, the second embodiment is disadvantages to the first embodiment in respect of space saving. In the first and second embodiments, the concave portions 26 and 28 are provided at both side margin edges of each of the link plates. There is no need to provide concave portions on both side margin edges, it is possible to provide a concave portion for at least one of the side margin edges of each link plate.

Third Embodiment

Figure 6:
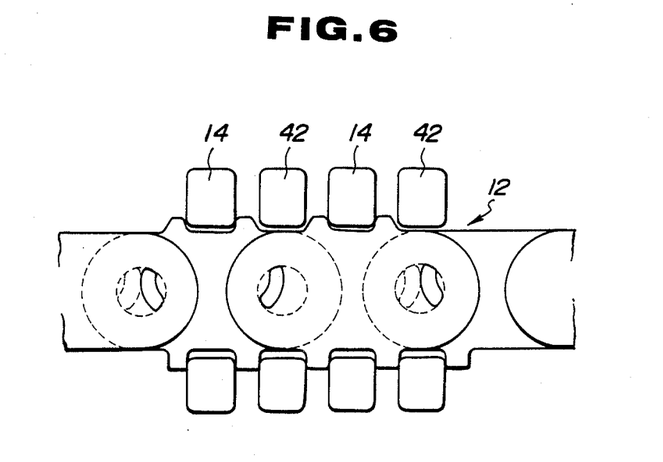
FIG. 6 is a similar view to FIG. 1, but showing a third embodiment of a transmission belt according to the present invention.

FIG. 6 shows the third embodiment. This embodiment is substantially the same as the second embodiment except the provision of additional load blocks 42, each arranged between the adjacent two load blocks 14. The additional blocks 42 are the same design as the blocks 14 and mounted on link plates in the same manner as the blocks 14 are. According to this third embodiment, the number of the load blocks which are subject to compression stress applied thereto when passing through each of pulleys grooves is two times as much as the number of the load blocks of the first or second embodiments, so the load blocks 14 and 42 have increased durability. Even though concave portions for receiving the load and additional blocks 14 and 42 are provided on both of the side margin edges of each of the link plates according to this third embodiment, the concave portions may be provided on at least two side margin edges of each link plate, if desired.

Fourth Embodiment

Figure 7:
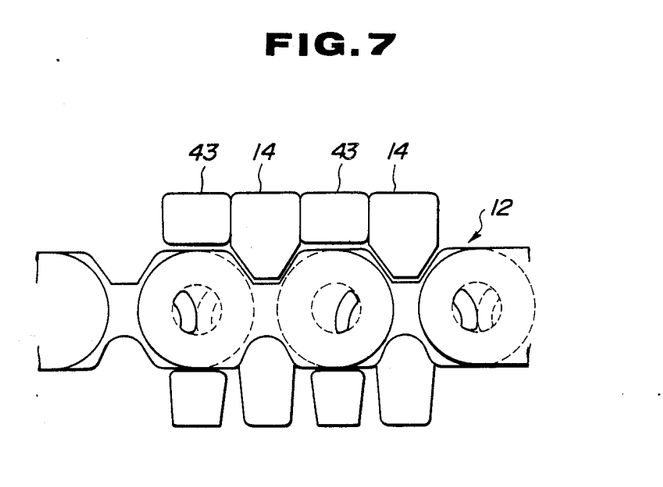
FIG. 7 is a similar view to FIG. 1, but showing a fourth embodiment of a transmission belt according to the present invention.

The fourth embodiment is described referring to FIG. 7. This embodiment is substantially the same as the first embodiment except the provision of tapered dummy blocks 43, each being interposed between the adjacent two blocks 14. In this embodiment, the blocks 14 and the dummy blocks 43 are tapered inwardly such that the power transmission belt can curve when passing through the V-shaped pulley groove. The dummy blocks 43 are not drivingly connected to the first and second chains 10 and 12 and thus do not transmit any force to them, but they share the compression force applied to the transmission belt by the pulleys so that the durability of the load blocks 14 increase.

Fifth Embodiment

Figure 8:
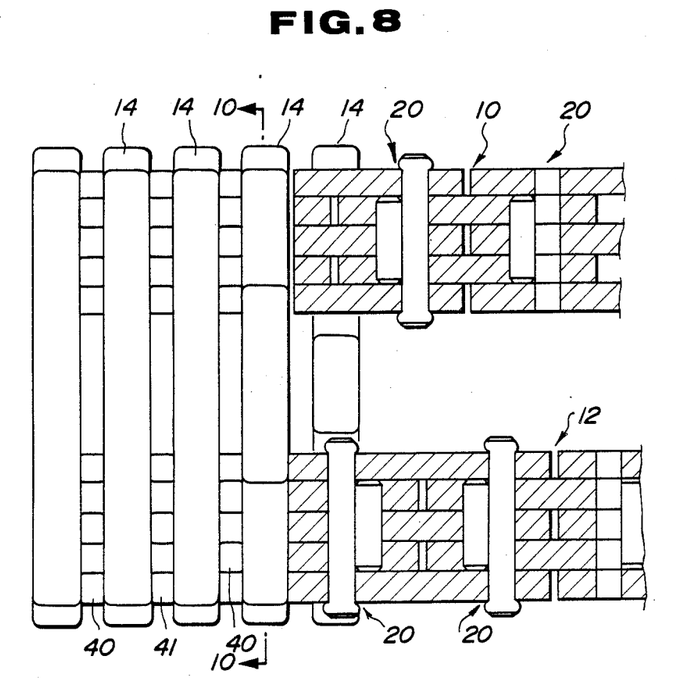
FIG. 8 is a fragmentary plan view of a fifth embodiment of a transmission belt partly sectioned.
Figure 9:
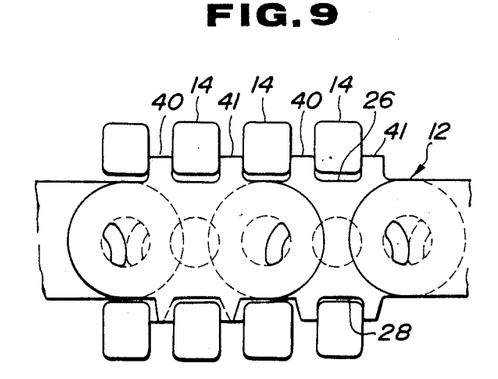
FIG. 9 is a fragmentary side elevation of the transmission belt shown in FIG. 8.
Figure 10:
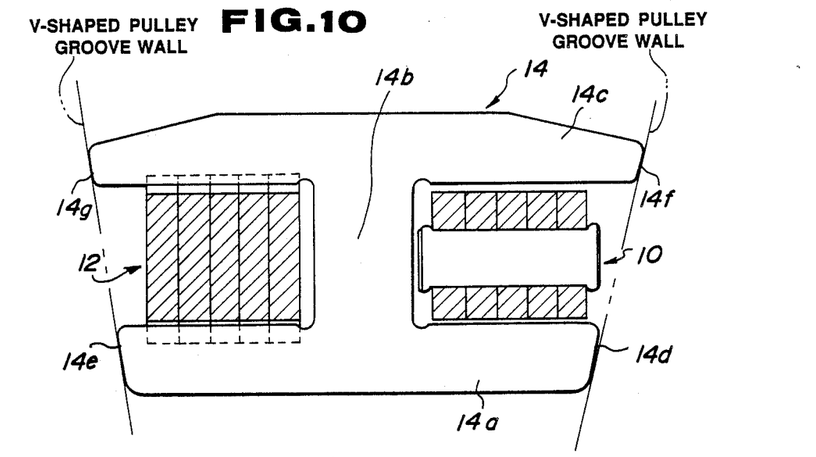
FIG. 10 is a section taken through the line 10—10 shown in FIG. 8.

FIGS. 8 to 10 show the fifth embodiment according to the present invention. This fifth embodiment is substantially the same as the third embodiment shown in FIG. 6. However, the fifth embodiment is different from the third embodiment in that joint pins 20 of a first chain 10 is positioned out of alignment with joint pins 20 of a second chain 12 by a displacement of ½ pitch. With this arrangement of the joint pins 20, there occurs sinusoidal vibrations of the first and second chains 10 and 12, during power transmission by the transmission belt, which vibrations are out of phase by ½. Thus, these vibration waves interact with each other in such a manner that one wave suppresses an amplitude of the other. The transmission belt as a whole, therefore, shows the same vibration characteristic as if it had less pitch. As a result, a level of noise occurring during power transmission by the transmission belt is reduced. This embodiment employs load blocks 14 as shown in FIG. 10. The load block 14 shown in FIG. 10 is different from the counterpart shown in FIG. 3 in that a guide portion 14c has both lateral ends formed with tapered surfaces 14f and 14g, respectively, which are adapted to engage with the pulley groove defining walls. Since the compression stress is shared by four tapered surfaces 14d, 14f, 14e and 14g, generation of excessively high local stress on the load block is avoided, thus enhancing the durability of the load blocks.

Sixth Embodiment

Figure 11:
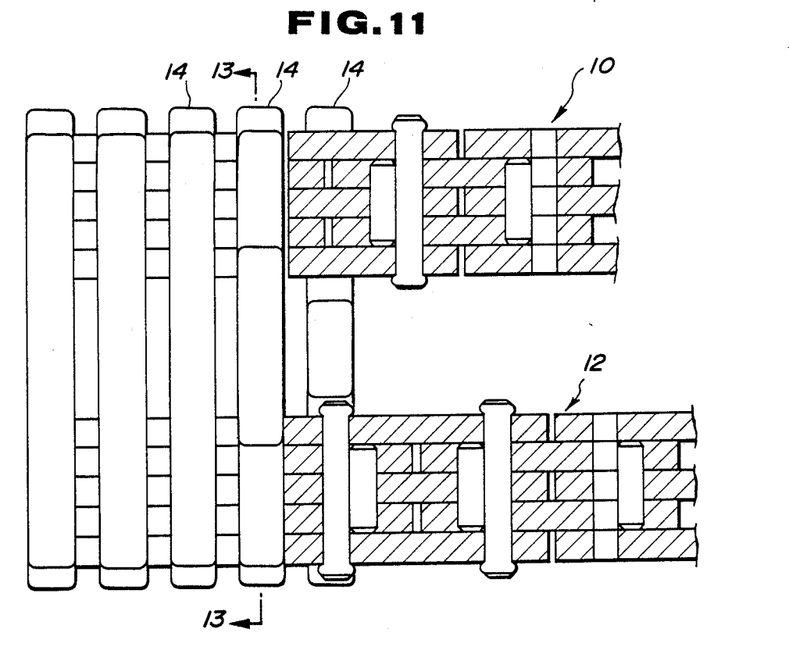
FIG. 11 is a fragmentary plan view of a sixth embodiment of a transmission according to the present invention.
Figure 12:
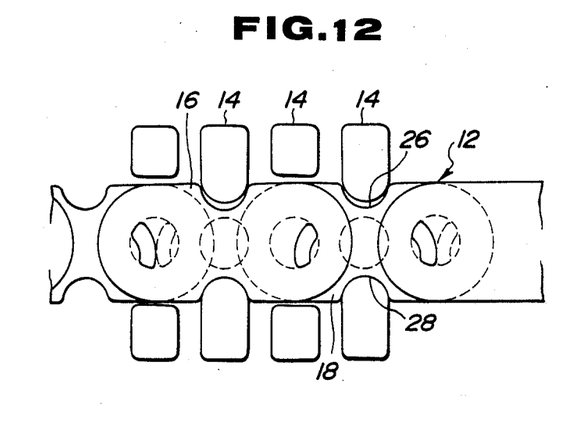
FIG. 12 is a fragmentary side elevation of the transmission belt shown in FIG. 11.
Figure 13:
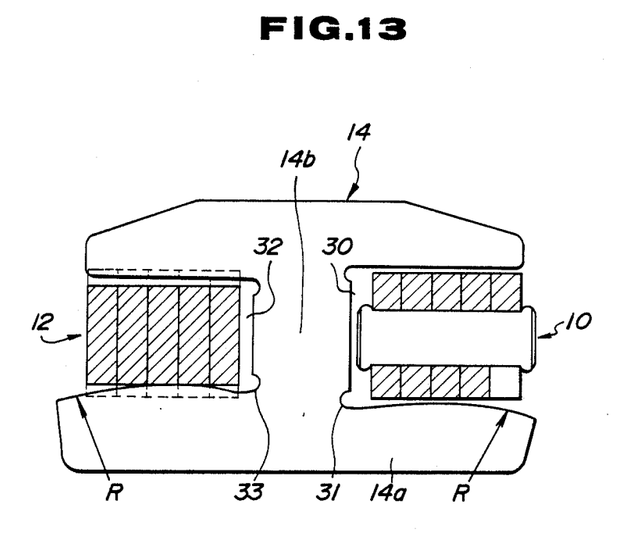
FIG. 13 is a section taken through the line 13—13 shown in FIG. 11.

FIGS. 11 to 13 show the sixth embodiment. This sixth embodiment is substantially the same as the fifth embodiment except that concave portions 26 and 28 are defined by cutouts extending inwardly of link plates 16 and 18. According to this sixth embodiment, each of load blocks 14 has a chain receiving portions 30 receiving one of the first and second chains 10 and 12 at a portion where the concave portions 26 and 28 are not formed, and a chain receiving portion 32 receiving the other chain at a portion where the concave portions 26 and 28 are formed. Thus, as shown in FIG. 13, the load chain receiving portions 30 and 32 of each of the load blocks 14 have different widths. When assembling the load blocks as shown in FIG. 13 in a manner as shown in FIG. 12, the load blocks 14 of the identical construction are assembled one in zero degree position arranged behind another in 180 degrees turned position.

In FIG. 13, there are shown recesses 31 and 33 formed inwardly into a pillar portion 14b from inward and edges of the chain receiving portions 30 and 32. This structure is advantageous over the case where such recesses are formed by cutting into the main body portion 14a in that durability of the blocks 14 increase. This is because the main body portion 14a is subject to relatively great compressible load. Besides, as shown in FIG. 13, the main body portion 14a is formed with crowning portions with a predetermined radius R of curvature. These crowning portions define lower side edges of the chain receiving portions 30 and 32, as viewed in FIG. 13. These crowning portions contact with the chains 10 and 12 at their bottom sides as viewed in FIG. 13. When it is subject to a compression force, the main body portion 14a deforms downwards as viewed in FIG. 13, causing the crowning portions to become flat to assure an even contact with the chains 10 and 12. Thus, durability of the blocks 14, and chains 10 and 12 increases.

Seventh Embodiment

Figure 14:
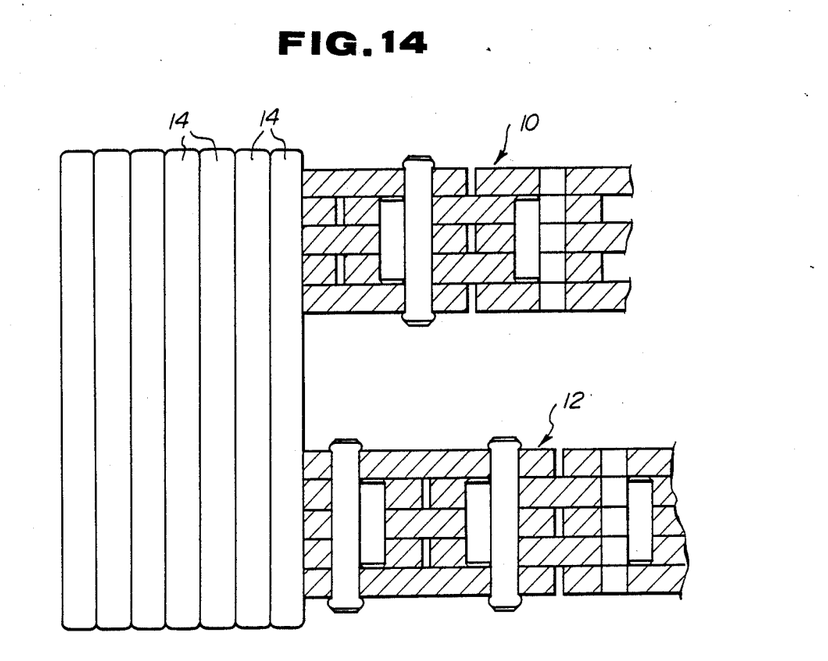
FIG. 14 is a fragmentary plan view of a seventh embodiment of a transmission belt partly sectioned.
Figure 15:
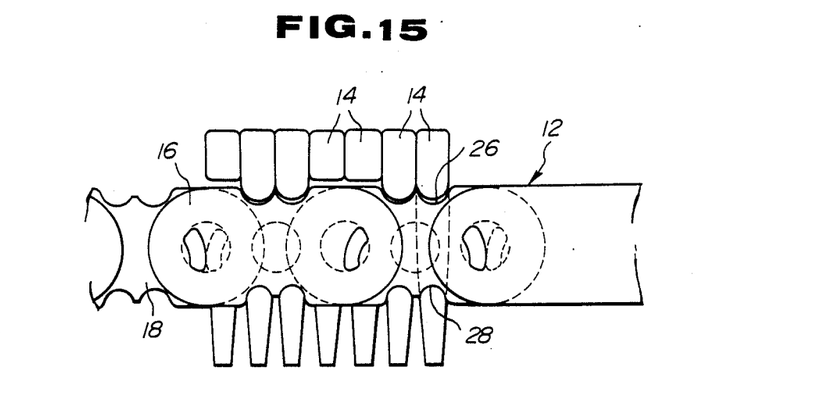
FIG. 15 is a fragmentary side elevation of the transmission belt shown in FIG. 14.

FIGS. 14 and 15 show the seventh embodiment according to the present invention. This embodiment is different from the sixth embodiment in that two of the load blocks 14 in zero degree position are arranged behind another two load blocks in 180 degrees turned position. Besides, in order to allow articulation of the transmission belt, the load blocks 14 are tapered downwards as viewed in FIG. 15. Concave portions 26 and 28 which outer column link plates 16 and inner column link plates 18 are formed with are configured to receive two load blocks 14 in a set, respectively.

Eighth Embodiment

Figure 16:
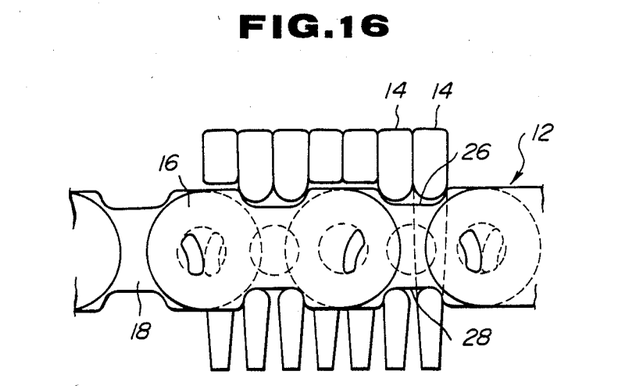
FIG. 16 is a fragmentary side elevation of an eighth embodiment of a transmission belt according to the present invention.
Figure 17:
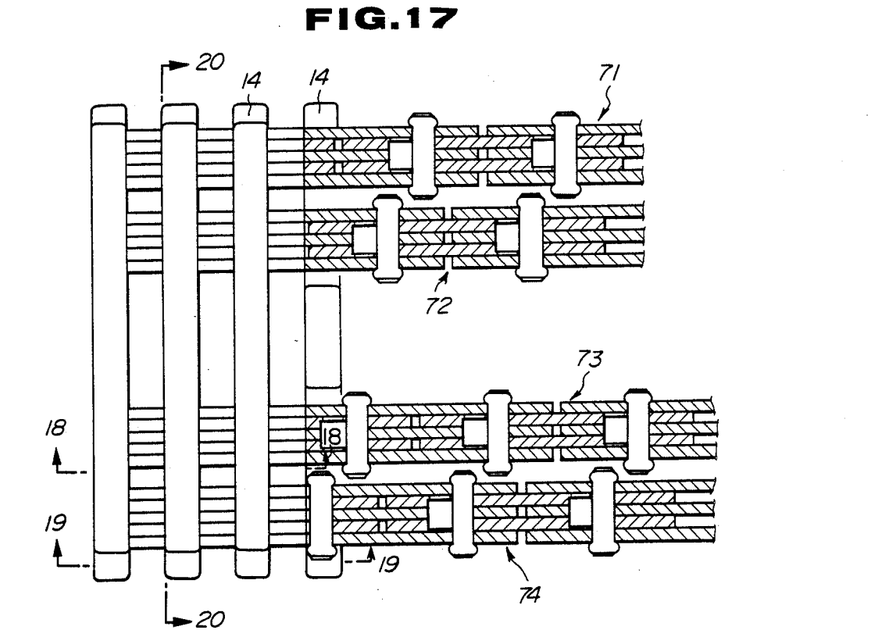
FIG. 17 is a fragmentary plan view of a ninth embodiment of a transmission belt partly sectioned.

FIG. 16 shows the eighth embodiment. This embodiment is substantially the same as the seventh embodiment except for the configuration of link plates. More specifically, concave portions 26 and 28 which the link plates are formed with are configured to receive both two of the load blocks 14 in a set.

Ninth Embodiment

Figure 18:
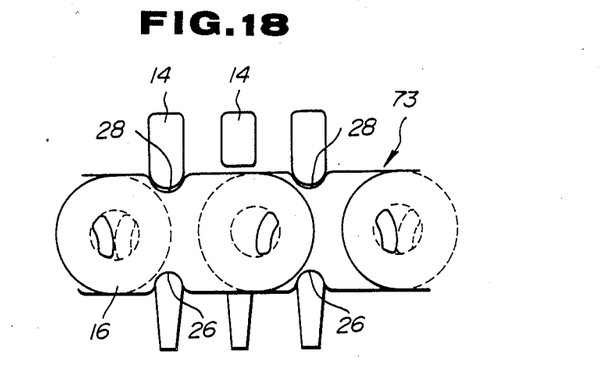
FIG. 18 is a section taken through the line 18—18 shown in FIG. 17.
Figure 19:
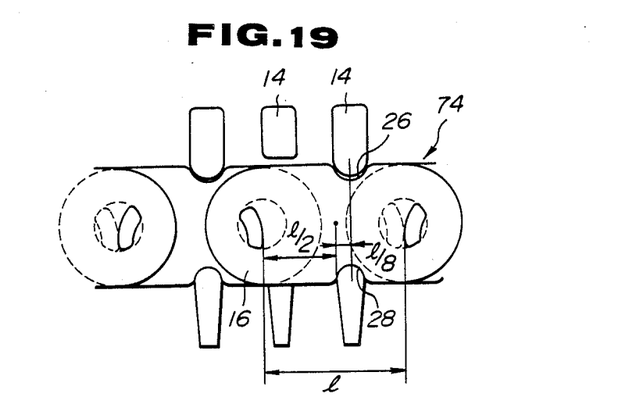
FIG. 19 is a section taken through the line 19—19 shown in FIG. 17.
Figure 20:
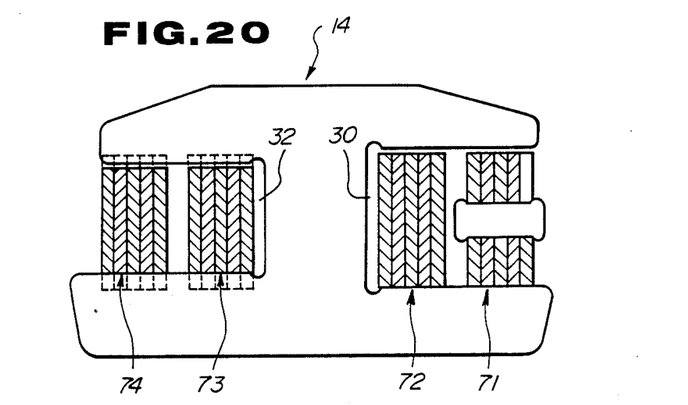
FIG. 20 is a section taken through the line 20—20 shown in FIG. 17.
Figure 21:
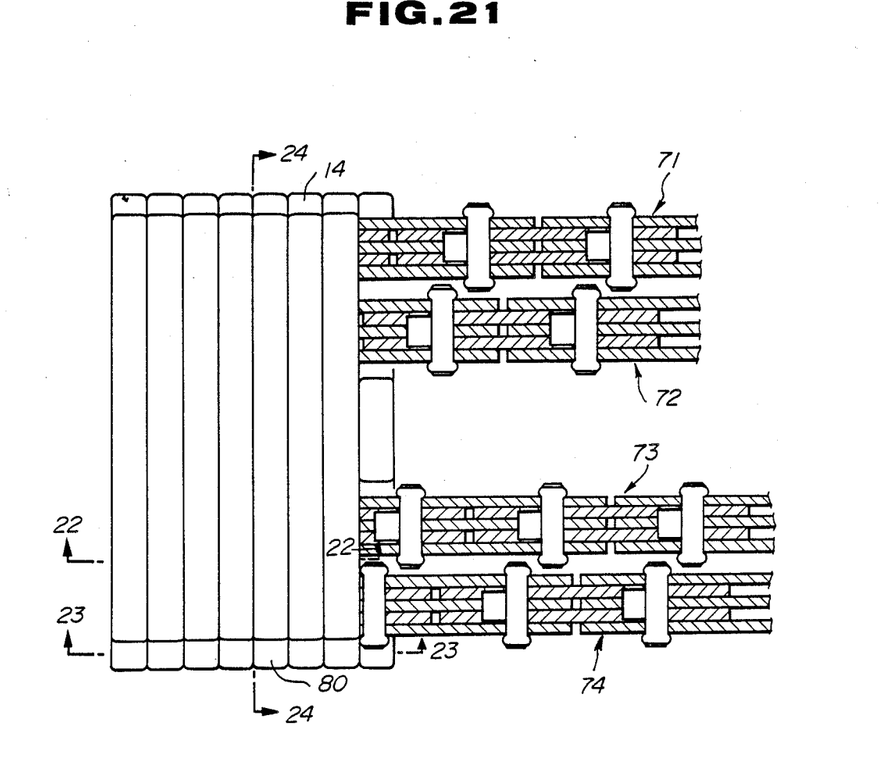
FIG. 21 is a fragmentary plan view of a tenth embodiment of a transmission belt partly sectioned.
Figure 22:
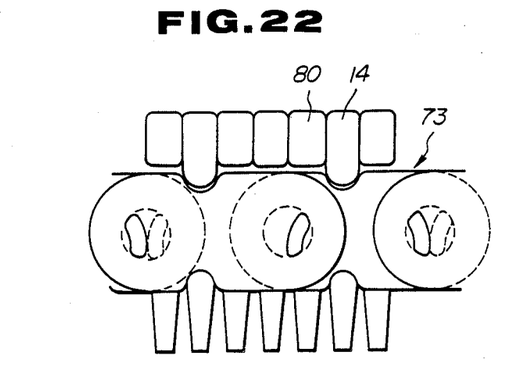
FIG. 22 is a section taken through the line 22—22 shown in FIG. 21.
Figure 23:
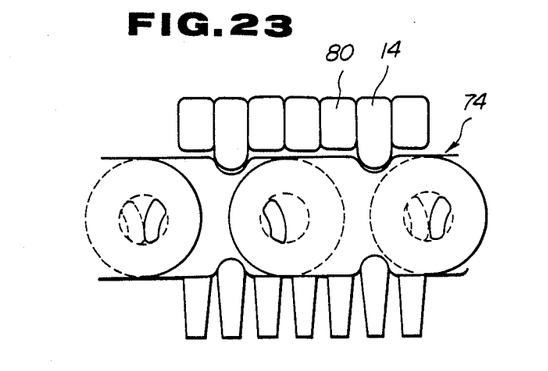
FIG. 23 is a section taken through the line 23—23 shown in FIG. 21.

FIGS. 17 to 20 show the ninth embodiment. This embodiment is different from the previously described embodiments in that, instead of two trains of chains, four trains of chains are employed. The first chain 71 and second chain 72 are inserted into a chain receiving portion 30 of each load block 14, while the third and fourth chains 73 and 74 are inserted into another chain receiving portion 32 thereof. For example, as shown in FIG. 19, each link plate 16 of the fourth chain 74 is formed with concave portions 26 and 28 at a location distant to the rigth as viewed in FIG. 19 from a location that is equidistant from both pin holes by ⅛ of the distance 1 (e1) between the two pin receiving holes. On the other hand, as shown in FIG. 18, the third chain 73 is provided by turning the fourth chain 74 through 180 degrees. The concave portions 28 and 26 of the third chain 73 and concave portions 26 and 28 of the fourth chain 74 are arranged in alignment relationship to allow assembly with the common load block 14. As a result, the pin holes of the third chain 73 are out of alignment with the pin holes of the fourth chain 74 by a displacement of ¼ pitch. The first and the second chains 71 and 72 are arranged in the same relationship as the previously described relationship which the third and fourth chains 73 and 74 are arranged in. The load blocks 14 are arranged one in zero degree position behind another in 180 degrees turned position. As shown in FIG. 20, each of the load blocks 14 has a chain receiving portion 30 which has a width (or height as viewed in FIG. 20) wider than the corresponding width of another chain receiving portion 32. Thus, the first and second chains 71 and 72 are out of alignment with the third and fourth chains 73 and 74 by a displacement of ½ pitch. Therefore, the first, second, third, and fourth chains 71, 72, 73, and 74 are displaced one after another by ¼ pitch. As a result, the transmission belt using the four trains of chains as arranged in the previously described manner has a virtual pitch increased as compared to the virtual pitch of the transmission belt using two trains of chains. This means, the former is advantageous over the latter in respect of suppressing noise. As will be understood from the previous description, even though four trains of chains 71, 72, 73, and 74 are used, they are made of chains of the identical construction and load blocks of the identical construction. Thus, with the same kind of chains and with the same kind of load blocks, the transmission belt is assembled.

Tenth Embodiment

Figure 24:
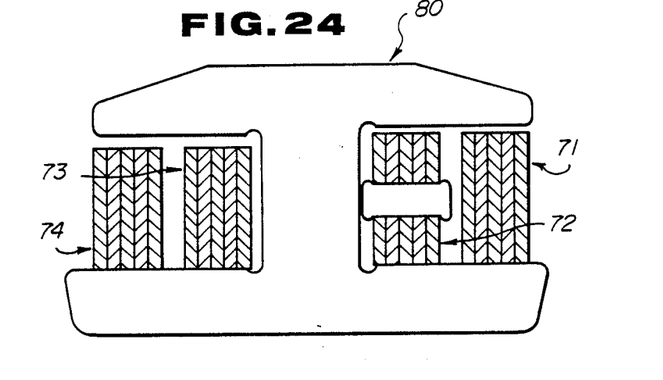
FIG. 24 is a section taken through the line 24—24 shown in FIG. 21.

FIGS. 21 to 24 show the tenth embodiment. This tenth embodiment is substantially the same as the ninth embodiment shown in FIGS. 17 to 20. However, it is different from the ninth embodiment in that load blocks 14 are arranged with dummy blocks 80 interposed therebetween. The dummy blocks 80 has a confuguration as shown in FIG. 24. If desired, the deviation of the concave portions 26 and 28 from the center equidistant from the pin holes may be set shorter than ¼ pitch. This structure of the link plates is preferrable in providing increased strength.

As previously described, according to the present invention, the chains are preassembled and thereafter inserted into chain receiving grooves of load blocks with thier concave portions receiving edges of the chain receiving grooves, so that workability in assembling the transmission belts has greatly improved. Since transmission of power is effected from the concave portions of the link plates to base and guide portions 14a and 14c of the load blocks 14, the stress concentration on the pillar portions 14b of the load blocks 14 can be avoided. Thus, the size of the load blocks can be reduced without degrading their durability.

What is claimed is:

1. A transmission belt for use in a power transmission between two pulleys, each having pulley groove defining walls, comprising:
   a plurality of chains, each including a plurality of link plates and a plurality of joint pins, each joining the adjacent two link plates of said plurality of link plates to permit articulation, said plurality of chains consisting of a first group and a second group;
   a plurality of load blocks, each having taper surfaces adapted to contact with the pulley groove defining walls, each of said plurality of load blocks including a first chain receiving portion opening laterally to allow lateral insertion of said first group of said plurality of chains and a second chain receiving portion opening latereally to allow lateral insertion of said second group of said plurality of chains, each of said plurality of load blocks including first edge means defining said first chain receiving portion and second edge means defining said second chain receiving portion, respectively;
   said plurality of link plates of each of said plurality of chains including concaves;
   said first group of said plurality of chains being inserted into said first chain receiving portions of said plurality of blocks with said concaves of said link plates thereof receiving said first edge means defining said second chain receiving portions.

2. A transmission belt as claimed in claim 1, wherein said plurality of chains are arranged side by side with said joint of one chain out of alignment with said joing pins of the adjacent chain.

3. A transmission belt as claimed in claim 1, including dummy blocks arranged on said plurality of chains between the adjacent two load blocks, each of said dummy blocks having taper surfaces adapted to contact with the pulley groove defining walls, each of said plurality of dummy blocks including two chain receiving portions opening laterally and receiving said plurality of chains thereinto, respectively.

4. A transmission belt as claimed in claim 1, wherein said plurality of chains consist of two chains which are arranged side by side with said joint pins out of alignment with said joint pins of the adjacent chain by one half of a distance between the adjacent two pins of said adjacent chain.

5. A transmission belt as claimed in claim 1, wherein said plurality of chains consist of four chains which are arranged side by side with said joint pins out of alignment with said joint pins of the adjacent chain by one fourth of a distance between the adjacent two pins of said adjacent chain.

6. A transmission belt as claimed in claim 1, wherein said first chain receiving portion of each of said plurality of load blocks is dimensioned to engage in said concaves of one of said plurality of link plates of one chain belonging to said first group of said plurality of chains, while said second chain receiving portion of each of said plurality of load blocks is dimensioned to receive one of said plurality of link plates of one chain belonging to said second group of said plurality of chains at a location displaced from said concaves thereof, and wherein said load blocks ar arranged one in zero degree position behind another in 180 degrees turned position.

7. A transmission belt as claimed in claim 1, wherein said first chain receiving portion of each of said plurality of load blocks is dimensioned to engage in said concaves of one of said plurality of link plates of one chain belonging to said first group of said plurality of chains at a locaation displaced from said concaves thereof, and wherein said load blocks are arranged one group in zero degree position behind another group in 180 degrees turned position.

* * * * *